United States Patent [19]

Shimizu et al.

[11] Patent Number: 4,961,877

[45] Date of Patent: Oct. 9, 1990

[54] SOLID SILICONE DEFOAMER

[75] Inventors: Hirofumi Shimizu, Odawara; Ken Morishita, Suita, both of Japan

[73] Assignee: Dow Corning K.K., Tokyo, Japan

[21] Appl. No.: 238,674

[22] Filed: Aug. 30, 1988

[30] Foreign Application Priority Data

Aug. 31, 1987 [JP] Japan ................................ 62-215494

[51] Int. Cl.$^5$ ................................................ C09K 3/00
[52] U.S. Cl. ....................................... 252/358; 252/321
[58] Field of Search ................................. 252/321, 358

[56] References Cited

U.S. PATENT DOCUMENTS

| | | | |
|---|---|---|---|
| 3,746,653 | 7/1973 | Churchfield | 252/321 |
| 4,123,383 | 10/1978 | Ihde, Jr. | 252/321 |
| 4,192,761 | 3/1980 | Peltree et al. | 252/358 X |
| 4,265,779 | 5/1981 | Gandolfo et al. | 252/321 X |
| 4,274,977 | 6/1981 | Koerner et al. | 252/358 |
| 4,514,319 | 4/1985 | Kulkarni | 252/321 |
| 4,599,189 | 7/1986 | Wuhrmann et al. | 252/358 |
| 4,690,713 | 9/1987 | Terae et al. | 252/358 X |
| 4,767,568 | 8/1988 | Abel et al. | 252/321 |

Primary Examiner—John M. Ford
Assistant Examiner—Catherine Scalzo
Attorney, Agent, or Firm—Jim L. DeCesare

[57] ABSTRACT

A solid silicone defoaming agent which includes a mixture of silicone oil having a viscosity of at least 20 centistokes at 25 degrees Centigrade and microparticulate silica, a copolymer selected from the group consisting of polyoxyalkylene and polyoxyalkylene/polysiloxane copolymers, and a wax selected from the group consisting of a water-insoluble wax which is insoluble in water at room temperature and which has a melting point of at least 35 degrees Centigrade, and a water-soluble wax which dissolves and disperses in water at room temeprature and which has a melting point of at least 30 degrees Centigrade.

4 Claims, No Drawings

4,961,877

SOLID SILICONE DEFOAMER

BACKGROUND OF THE INVENTION

The present invention relates to a solid silicone defoaming agent.

Silicone defoaming agents are widely used in the art for defoaming and foam suppression. Addition in small quantities to an aqueous or nonaqueous foaming system has a remarkable defoaming effect. The compounds are chemically inert and colorless, transparent, and odorless, and do not have adverse effects.

Foam inhibition is achieved in nonaqueous foaming systems mainly by the use of a defoaming agent comprising a dimethylpolysiloxane silicone oil or a defoaming agent comprising a silicone oil compound in which microparticulate silica is dispersed in dimethylpolysiloxane oil. For defoaming or foam inhibition in aqueous foaming systems, use is made of an emulsion-type defoaming agent in which the silicone oil compound has been emulsified using a suitable emulsifying agent.

However, the prior emulsion-type defoaming agents used for aqueous foaming systems suffer from problems, such as poor emulsion stability, resulting in destruction of the emulsion and separation of the silicone oil compound due to temperature changes and shaking during transport, or simply by long-term storage.

Other disadvantages relate to decomposition and the appearance of mold when a suitable preservative or antimold is not added. Further, the defoaming agent is a liquid, so addition to the foaming system necessitates a dosing pump or manual intervention.

A solid silicone defoaming agent has been obtained by melting a water-soluble wax together with an organopolysiloxane as the effective component of the defoaming agent followed by solidification by cooling and therefore would appear to solve the above problems.

However, considering this known solid silicone defoaming agent, it is noted that the miscibility of the organopolysiloxane with the water-soluble wax is poor, which causes the appearance of a heterogeneous phase upon solidification from the melt during production. Due to this heterogeneous phase, the solid defoaming agent will not satisfactorily disperse in water when it is applied, and a portion remains undissolved.

Attempts have been made to solve this problem by the addition of an emulsifying agent. However, the defoaming effect is significantly weakened when a large quantity of hydrophilic emulsifying agent is added. Another problem is encountered when a lipophilic emulsifying agent is added, that is, the organopolysiloxane component becomes less dispersible in water, with the result that a satisfactory defoaming effect is not realized.

Japanese Kokai Patent Application No. 59-222209 [222,209/84] discloses a solid defoaming agent which includes a polyoxyethylene group-containing water-soluble wax in a silicone oil compound. However, while the dispersibility of the silicone oil compound in water is improved with this solid defoaming agent, the properties nevertheless remain unsatisfactory. Furthermore, a high-shear dispersion device is required in the preparation of the solid defoaming agent in order to obtain a homogeneous composition. An additional disadvantage is that a quenching process is required.

SUMMARY OF THE INVENTION

The object of the present invention is to avoid the above problems by providing a solid silicone defoaming agent which has an excellent dispersibility, particularly in water, and which has a powerful defoaming activity, and is easily produced.

DETAILED DESCRIPTION OF THE INVENTION

In accordance with the present invention, there is provided a solid silicone defoaming agent which characteristically comprises
(A) 5 to 60 parts by weight of a self-emulsifying defoaming agent and
(B) 95 to 40 parts by weight of wax; wherein said self-emulsifying defoaming agent (A) consists of at least 5 weight % silicone oil compound comprising
  (a) silicone oil having a viscosity of at least 20 centistokes at 25 degrees Centigrade, and
  (b) microparticulate silica,
  (c) at least 30 weight % of a polyoxyalkylene and/or polyoxyalkylene/polysiloxane copolymer, and optionally
  (d) zero to 30 weight % of a water-soluble surfactant other than copolymer (c); wherein said wax (B) consists of
    (i) wax which does not disperse or dissolve in water at room temperature and which has a melting point of at least 35 degrees Centigrade, and/or
    (ii) wax which dissolves or disperses in water at room temperature and which has a melting point of at least 30 degrees Centigrade;
and wherein the wax component (i) comprises no more than 60 weight % of the overall defoaming agent.

The solid silicone defoaming agent of the present invention is prepared by melting a water-insoluble wax and/or water-soluble wax, dispersing into the wax self-emulsifying defoaming agent, and solidifying the mixture by cooling. Due to the high dispersibility of the defoaming agent in the wax melt, a solid defoaming agent which has a uniform composition in which the defoaming agent and wax are dispersed to homogeneity, is obtained without the use in the mixing stage of a high-shear emulsifying device, such as a homomixer or colloid mill, and without the application in the cooling-/solidification process of a quench or temperature control, for the purpose of preventing separation or aggregation of the defoaming agent. When the solid silicone defoaming agent is added to an aqueous foaming system, the defoaming agent becomes homogeneously dispersed in the foaming system due to the activity of the wax. A heterogeneneous phase will not appear, which makes possible generation of a superior defoaming effect.

The solid silicone defoaming agent of the present invention essentially consists of a self-emulsifying defoaming agent compound (A) and wax (B).

The self-emulsifying defoaming agent compound (A) is composed of a silicone oil compound, a polyoxyalkylene and/or polyoxyalkylene/polysiloxane copolymer, and optionally a liquid, water-soluble surfactant. This component is the active component of the solid silicone defoaming agent of the present invention. The self-emulsifying defoaming agent compound has the ability to form an oil-in-water emulsion when stirred into water.

Furthermore, the silicone oil compound constituent of the self-emulsifying defoaming agent (A) consists of (a) silicone oil composed of polydimethylsiloxane with a viscosity of at least 20 centistokes at 25 degrees Centigrade and (b) microparticulate silica. The defoaming agent must contain at least 5 weight % of silicone oil compound. It is preferred that the proportions of silicone oil (a) and microparticulate silica (b) fall within the range of, for example, 80–99.5:0.5–20 by weight.

The polydimethylsiloxane is known and is produced, for example, by the hydrolysis of dimethyldihalosilane followed by condensation, or by the decomposition of dimethylcyclosiloxane followed by condensation. The polydimethylsiloxane will generally be end blocked by the trimethylsilyl group or hydroxyl group, but is not so limited.

The viscosity of the polydimethylsiloxane should be at least 20 centistokes at 25 degrees Centigrade in order to obtain the required defoaming activity. However, no limitation is placed on the upper limit of viscosity, and it can be 1,000,000 centistokes or higher at 25 degrees Centigrade.

A preferred microparticulate silica, is prepared by replacing the water in a silica hydrogel with a low-boiling organic solvent such as ethanol and removing the organic solvent by heating the gel to around the critical temperature of the organic solvent. In this manner excessive shrinkage or collapse of the silica's cellular structure is avoided. However, commercially available microparticulate silicas can be used in the present invention. Other silicas can also be used, for example, precipitated silica, silica xerogel, fumed silica, and silicas having surface organosilyl groups.

The silicone oil compound may contain up to 10 weight % siloxane resin essentially composed of $(CH_3)_3SiO_{\frac{1}{2}}$ units and $SiO_2$ units, which serves to provide a defoaming agent having an even better defoaming activity. While the siloxane resin can be of any known type, it will typically be prepared by the cohydrolysis and condensation of $(CH_3)_3SiCl$ and $SiCl_4$ or by the reaction of $(CH_3)_3SiCl$ with acidic silica sol. Mineral oil can optionally be blended into the silicone oil compound.

The polyoxyalkylene and/or polyoxyalkylene/polysiloxane copolymer (c) functions to impart water dispersibility to the silicone oil compound and improves water dispersibility. Along with component (c), a liquid, water-soluble surfactant (d) other than component (c) can be present.

The polyoxyalkylene preferably consists of polyoxypropylene polymers or polyoxypropylene/polyoxyethylene copolymers. Liquid polymers of this type are commercially available, and consist of polymers having $CH_2CH(CH_3)O$ units and $CH_2CH_2O$ units terminating in, for example, the methyl group, ethyl, propyl, or the hydroxyl group. These types of polyoxyalkylenes are known as "polypropylene glycols" and "polypropylene-polyethylene glycols", and molecular weights of 500 to 6,000 are particularly preferred.

The following compounds with general formulas (1)–(4) can be used as the polyoxyalkylene-polysiloxane copolymers.

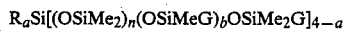  (1)

  (2)

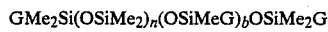  (3)

  (4)

wherein in each of the above formulas,
R is a hydrocarbon group having one to ten carbon atoms but without aliphatic unsaturation;
Me is methyl;
G is a group with the structural formula $—D(OR')_mA$ in which D is an alkylene group having one through thirty carbon atoms, R' is an alkylene group having 2 through 10 carbon atoms, m has a value of at least 1, and A is a terminal group;
a is zero or one;
n has a value of at least one;
b has a value of 1–50; and
c has a value of 1–50.

In the above general formulas (1)–(4) further, examples of R are methyl, ethyl, propyl, isopropyl, butyl, hexyl, decyl, phenyl, tolyl, benzyl, xylyl, methylcyclohexyl, cyclohexyl, cyclopentyl, beta-phenylpropyl, and beta-phenylethyl.

The alkylene group D, which bonds the glycol moiety expressed by G to silicon, is exemplified by methylene, ethylene, propylene, and isopropylene.

R' in the above structural formula may be any alkylene group having 2 through 10 carbon atoms. Preferred examples of R' are ethylene, propylene, isopropylene, and butylene.

The subscript m, which specifies the number of OR' units in the glycol moiety of the molecule, ranges from values as small as about 1 to as large as 1,000 or even larger; however, it typically has an average value falling in the range of 10 to 100.

The glycol or polyoxyalkylene unit is terminated or capped by group A. Thus, glycol chain-capping units can be the hydroxyl group where A=hydrogen atom, an ether group where A=monovalent hydrocarbon groups such as methyl, butyl, vinyl, or phenyl, or a carboxyl group, the salt or ester of a carboxyl group, a carbonate ester group, or an isocyanate group.

The subscript n specifies the number of dimethylsiloxane units in the molecule, and has a value of at least 1 to 1,500 or larger.

In addition, the following copolymers are useful as polyoxyalkylene-polysiloxane copolymers in the present invention:

(1) Copolymers essentially composed of $SiO_2$ units, $(CH_3)_3SiO_{\frac{1}{2}}$ units, and $Q(CH_3)_2SiO_{\frac{1}{2}}$ units where Q in the formula is a polyoxypropylene polymer or polyoxypropylene/polyoxyethylene copolymer group with a molecular weight in the range of 500 to 6,000 bonded to silicon via the Si-C bond, and in which the ratio of $SiO_2$ units to the total of $(CH_3)_3SiO_{\frac{1}{2}}$ units and $Q(CH_3)_2SiO_{\frac{1}{2}}$ units is 1:0.4 to 1:1.2.

(2) Siloxane copolymers selected from the group consisting of copolymers which are reaction products obtained by heating a mixture of siloxane copolymer essentially composed of $SiO_2$ units and $(CH_3)_3SiO_{\frac{1}{2}}$ units in which the ratio of $SiO_2$ units to $(CH_3)_3SiO_{\frac{1}{2}}$ units is 1:0.4 to 1:1.2 and hydroxylated polyoxypropylene polymers or hydroxypolyoxypropylene/polyoxyethylene copolymers with a molecular weight in the range of 500 to 6,000.

Copolymer (1) is obtained by the cohydrolysis condensation of a mixture of $(CH_3)_3SiCl$, $H(CH_3)_2SiCl$, and $SiCl_4$, followed by coupling the condensate with allyloxy-terminated polyoxyalkylene polymer in the presence of a platinum catalyst.

Copolymer (2) is obtained by, for example, heating the mixture of the two components under reflux for about 2 hours in the presence of a siloxane condensation catalyst such as potassium hydroxide or tin octoate.

The liquid water-soluble surfactant (d) is present in the defoaming agent as an assistant to component (c), and functions to increase the miscibility of the defoaming agent with the wax. Examples of liquid water-soluble surfactant (d) are liquids with an HLB of at least 9 comprising, for example, polyoxyethylene alkylphenyl ethers, polyoxyethylene sorbitan fatty acid esters, polyglycerin fatty acid esters, polyoxyethylene alkyl ethers, polyoxyethylene castor oil, and polyoxyethylene hardened castor oil.

The self-emulsifiable defoaming agent (A) can be prepared by simply mixing the components (a) through (c) or (a) through (d) using a suitable mixing means, with heating and stirring.

The wax (B) which is blended into the self-emulsifying defoaming agent (A) consists of (i) wax which does not disperse or dissolve in water at room temperature and which has a melting point of at least 35 degrees Centigrade and/or (ii) wax which disperses or dissolves in water at room temperature and which has a melting point of at least 30 degrees Centigrade.

Examples of wax (i) are saturated higher fatty acids and lower oxyalkylene adducts, glycerin saturated higher fatty acid esters, sorbitan saturated higher fatty acid esters, saturated higher fatty acid amides, alkaline earth metal salts of saturated higher fatty acids, saturated higher alcohols and lower oxyalkylene adducts.

Wax (i) functions to maintain the defoaming agent in the solid state, and, like the component (c) in the self-emulsifiable defoaming agent (A), serves at the same time to control the dispersibility or solubility of the defoaming agent in water. As the proportion of wax (i) is increased, the defoaming agent becomes less soluble, with the result that the defoaming agent is gradually discharged into water over longer periods of time. However, the concentration of the defoaming agent in the water is also reduced at the same time, resulting in a lower defoaming activity. As a result, the upper limit on the proportion of wax (i) is designated at 60 weight % of the total defoaming agent.

Examples of wax (ii) are high-molecular weight polyalkylene glycols, polyoxyethylene (alkylene) esters of saturated higher fatty acids, polyoxyethylene (alkylene) higher saturated alcohol ethers, polyoxyethylene sorbitan saturated higher fatty acid esters, polyoxyethylene glycerin saturated fatty acid esters, polyoxyethylene alkylphenyl ethers, polyoxyethylene hardened castor oil, alkyl sulfate alkali metal salts, and alkali metal salts of saturated higher fatty acids.

Wax (ii) functions to maintain the overall defoaming agent in the solid state and at the same time functions as an emulsifying agent and dissolver. It also has the function of directly inducing discharge of the defoaming agent into water. Thus, when the proportion of wax (ii) relative to wax (i) is increased, the dissolution rate of the defoaming agent is increased and this generates a stronger defoaming activity.

The solid defoaming agent of the present invention is prepared by melting quantities of wax (i) and/or wax (ii) comprising wax (B) at temperatures of 40 to 200 degrees Centigrade, combining and mixing the wax with the self-emulsifying defoaming agent (A), pouring the mixture into a mold, solidifying the mixture by cooling, and releasing the product from the mold. The order of addition of the starting materials is not important, and preparation is possible by mixing the respective components and heating and melting at the same time.

In another method, preparation may be conducted by mixing each component of the self-emulsifying defoaming agent individually with wax (i) and/or wax (ii).

The components are blended at 5 to 60 weight %, preferably 10 to 50 weight % of the self-emulsifying defoaming agent (A) and 95 to 40 weight % preferably 90 to 50 weight % wax (B). When less than 5 weight % self-emulsifiable defoaming agent (A) is present, the defoaming agent will have an unsatisfactory defoaming activity. When more than 60 weight % is present, little of wax (B) is present so that solidification becomes a problem.

With regard to the composition of wax (B), the ratio between wax (i) and wax (ii) is variable, up to and including use of one but not the other. However, the use of both is preferred because both afford a balance between homogeneity of the composition of the solid defoaming agent and dispersibility or solubility in water. The proportion of wax (i) in the defoaming agent is preferably 10 to 60 weight % and in particular does not exceed 50 weight %. When the proportion of wax (i) exceeds 60 weight %, the defoaming agent is poorly water soluble. On the other hand, the proportion of wax (ii) in the overall defoaming agent is preferably at least 10 weight % even when used in combination with wax (i).

In addition to the self-emulsifiable defoaming agent (A) and wax (B), the solid defoaming agent of the present invention may include additives such as perfumes and colorants used to improve the properties of such compositions.

The present invention will be explained with reference to the following examples, in which parts=weight parts and %=weight %.

EXAMPLE I

Preparation of Defoaming Agent Compounds

Defoaming agent compounds A to C were prepared by the following methods.

Compound A

8% Wet-method silica and 2% MQ resin which is a xylene solution, 75% solids, of siloxane resin consisting of $(CH_3)_3SiO_{\frac{1}{2}}$ units and $SiO_{4/2}$ units in a ratio within the range of 0.4:1 to 1.2:1, were added to 90% dimethylpolysiloxane having a viscosity of 1,000 centistokes at 25 degrees Centigrade, and dispersed to homogeneity and heated to 180 to 200 degrees Centigrade providing defoaming agent compound A.

Compound B

15% Silicone oil prepared by heating 95% dimethylpolysiloxane having a viscosity of 350 centistokes at 25 degrees Centigrade, 5% wet-method silica with trace acid catalyst was stirred into 85% water-soluble polyoxyalkylene-polysiloxane copolymer having a viscosity at 25 degrees Centigrade of 1,200 centistokes and a cloud point of 38 degrees Centigrade, to provide defoaming agent B.

This defoaming agent B was easily dispersed in water with stirring and self-emulsification to produce a milky-white emulsion.

Compound C

A homogeneous dispersion was prepared from 10% of the polyoxyalkylene/polysiloxane copolymer obtained by reacting MQ resin and polyoxyethylene/polyoxypropylene of molecular weight of 6,000, 5% polyoxyethylene alkylphenyl ether which is Triton X100 from Rohm & Haas Company and 45% polypropylene glycol of molecular weight 2,000. 40% of Compound A was added with stirring to homogeneity to provide self-emulsifying compound C.

Compound C was easily dispersed by stirring in water to afford a milky-white emulsion.

EXAMPLE II

Preparation and Testing of Defoaming Agents

Solid defoaming agents numbered 1 through 7 were prepared by the following production method using the proportions set forth in Table 1, and the homogeneity of the composition, dispersibility in water, and defoaming activity of each were tested by methods set forth below.

EXAMPLE III

Preparation of Solid Defoaming Agents

Solid defoaming agents were prepared by melting the water-insoluble wax (i) and the water-soluble wax (ii) at 80 to 100 degrees Centigrade and adding the defoaming agent with mixing to homogeneity in a propeller stirrer. The mixture was poured into a mold and allowed to solidify under spontaneous cooling. The defoaming agent and waxes used were:

Defoaming Agent 1 defoaming agent=compound B
wax (i)=stearyl monoglyceride (mp=68 degrees Centigrade)
wax (ii)=polyoxyalkylene (mp=50 degrees Centigrade) of 80% polyoxyethylene/20% polyoxypropylene (MW=10,000).

Defoaming Agent 2

Defoaming agent 1 was used with compound C.

Defoaming Agent 3

Stearyl diethanolamide was additionally blended with defoaming agent 2.

Defoaming Agent 4

Defoaming agent 3 was used with polyoxyethylene (30) octylphenyl ether (mp=35 degrees Centigrade) as wax (ii).

Defoaming Agent 5

Defoaming agent 3 was used, but wax (ii) was omitted.

Defoaming Agent 6 (Comparison)

Compound A was used with defoaming agent 3.

Defoaming Agent 7 (Comparison)

The proportion of wax (i) was raised to 70% in defoaming agent 2.

EXAMPLE IV

Composition homogeneity: The surface of the solid defoaming agent was inspected to evaluate the status of the dispersion of the defoaming agent and the presence or absence of oil fraction bleed onto the surface. The following scale was used for evaluation:

++: homogeneous, no bleed
+: slight bleed
x: nonuniform, bleed.

Dispersibility in water: 1 g of the solid defoaming agent was dissolved in 200 g of water in a glass bottle and allowed to stand for 60 minutes. After the elapse of 60 minutes, the undissolved fraction was removed, and the dissolved fraction was manually shaken for two minutes and the status of the dispersion was inspected. The following scale was used for evaluation:

++: homogeneous dispersion
+: partial aggregation
x: aggregation
−: dispersion impossible.

Foaming: 1 g of the solid defoaming agent equivalent to 1 square cm was placed in a glass bottle containing 100 g of a 1% aqueous solution of polyoxyethylene (2) sorbitan monooleate ester, and allowed to stand for 60 minutes. After removing the undissolved fraction, the mixture was shaken in a Barrell wrist-action shaker for 10 seconds. The time from immediately after cessation of shaking until the disappearance of the foam was measured. The same sample was then additionally shaken for periods of 40, 60, 120, 180, and 180 seconds, and defoaming times were measured.

The results are shown in Table 2.

As Table 2 indicates, because the solid silicone defoaming agent of the present invention is prepared by dispersing a specific self-emulsifiable defoaming agent compound with non-water-dispersible or non-water-soluble wax (i) and/or water-dispersible or water-soluble wax (ii) and cooling for solidification, the defoaming agent compound is easily and stably dispersed in the wax to afford a homogeneous composition. Furthermore, the solid silicone defoaming agent is easy to prepare and has an excellent defoaming activity. In particular, when waxes (i) and (ii) are used in combination, an excellent dispersibility in water is obtained.

TABLE 1

| | defoaming agent number | | | | | | |
|---|---|---|---|---|---|---|---|
| | examples | | | | | comparison examples | |
| component | 1 | 2 | 3 | 4 | 5 | 6 | 7 |
| defoaming agent compound | | | | | | | |
| compound A | | | | | | 40 | |
| compound B | 20 | | | | | | |
| compound C | | 20 | 40 | 40 | 40 | | 20 |
| wax (i) | | | | | | | |
| stearyl monoglyceride | 10 | 10 | 20 | 20 | 40 | 20 | 50 |
| stearyl diethanolamide | | | 20 | 20 | 20 | 20 | 20 |
| wax (ii) | | | | | | | |
| polyoxyalkylene (MW 10,000, mp 50° C.) | 70 | 70 | 20 | | | 20 | 10 |
| polyoxyethylene (30) octylphenyl ether | | | | 20 | | | |

TABLE 2

| | defoaming agent number | | | | | | |
|---|---|---|---|---|---|---|---|
| | examples | | | | | comparison examples | |
| test item | 1 | 2 | 3 | 4 | 5 | 6 | 7 |
| composition homogeneity | ++ | ++ | ++ | ++ | ++ | ++ | ++ |
| dispersibility | ++ | ++ | ++ | ++ | + | X | − |

TABLE 2-continued

| | defoaming agent number | | | | | | |
|---|---|---|---|---|---|---|---|
| | examples | | | | | comparison examples | |
| test item | 1 | 2 | 3 | 4 | 5 | 6 | 7 |
| in water defoaming(s) shaking time | | | | | | | |
| 10 seconds | 7 | 5 | 3 | 5 | 3 | 3 | 8 |
| 40 seconds | 7 | 5 | 3 | 5 | 3 | 3 | 16 |
| 60 seconds | 7 | 6 | 4 | 5 | 3 | 3 | 23 |
| 120 seconds | 8 | 7 | 4 | 5 | 3 | 730 | 730 |
| 180 seconds | 8 | 7 | 4 | 5 | 3 | 730 | 730 |
| 180 seconds | 8 | 8 | 4 | 5 | 5 | 730 | 730 |

That which is claimed is:

1. A solid silicone defoamer comprising
(A) 5 to 60 parts by weight of a self-emulsifying defoaming agent being a mixture of:
   (i) at least 5 weight % of silicone oil having a viscosity of at least 20 centistokes at 25 degrees Centigrade and microparticulate silica, and
   (ii) at least 30 weight % of a material selected from the group consisting of polyoxyalkylene and polyoxyalkylene/polysiloxane copolymers,
(B) 95 to 40 parts by weight of wax; said wax being selected from the group consisting of:
   (i) a water-insoluble wax which is insoluble in water at room temperature and which has a melting point of at least 35 degrees Centigrade, and
   (ii) a water-soluble wax which dissolves and disperses in water at room temperature and which has a melting point of at least 30 degrees Centigrade; and wherein wax (i) is present at less than 60 weight % of the defoamer.

2. The defoamer of claim 1 also including in (A) 1 to 30 weight % of a water soluble surfactant.

3. The defoamer of claim 1 in which the component (A) (ii) is a compound selected from the group consisting of polyoxypropylene polymers, polyoxypropylene/polyoxyethylene copolymers, and compounds with general formulas (1)–(4):

$$R_aSi[(OSiMe_2)_n(OSiMeG)_bOSiMe_2G]_{4-a} \quad (1)$$

$$R_aSi[(OSiMe_2)_n(OSiMeG)_cOSiMe_3]_{4-a} \quad (2)$$

$$GMe_2Si(OSiMe_2)_n(OSiMeG)_bOSiMe_2G \quad (3)$$

$$Me_3Si(OSiMe_2)_n(OSiMeG)_cOSiMe_3, \quad (4)$$

wherein:
R is a hydrocarbon group having one to ten carbon atoms but without aliphatic unsaturation;
Me is methyl;
G is a group with the structural formula —D(OR'-)$_m$A in which D is an alkylene group having one through thirty carbon atoms, R' is an alkylene group having 2 through 10 carbon atoms, m has a value of at least 1, and A is a terminal group;
a is one;
n has a value of at least one;
b has a value of 1–50; and
c has a value of 1–50.

4. The defoamer of claim 2 wherein the component (A) (ii) is a liquid with an HLB number of at least nine and being a compound selected from the group consisting of polyoxyethylene alkylphenyl ethers, polyoxyethylene sorbitan fatty acid esters, polyglycerin fatty acid esters, polyoxyethylene alkyl ethers, polyoxyethylene castor oil, and polyoxyethylene hardened castor oil.

* * * * *